United States Patent [19]

Croteau

[11] Patent Number: 5,303,020

[45] Date of Patent: Apr. 12, 1994

[54] OPTICAL TRANSCEIVER APPARATUS HAVING TIME PROGRAMMED GAIN

[75] Inventor: Michael G. Croteau, Ocoee, Fla.

[73] Assignee: Litton Systems, Inc., Beverly Hills, Calif.

[21] Appl. No.: 997,729

[22] Filed: Dec. 30, 1992

[51] Int. Cl.$^5$ .................................................. G01C 3/08
[52] U.S. Cl. ........................... 356/5; 356/152;
  359/152; 359/169; 359/170; 359/257; 250/214 C
[58] Field of Search ........ 359/152, 156, 159, 169–170,
  359/256–257; 356/5, 152; 250/214 C

[56] References Cited

U.S. PATENT DOCUMENTS

| | | | |
|---|---|---|---|
| 3,704,997 | 12/1972 | Smith | 350/157 |
| 3,780,296 | 12/1973 | Waksberg et al. | 250/201 |
| 3,856,402 | 12/1974 | Low et al. | 356/5 |
| 4,071,751 | 1/1978 | Waksberg | 250/201 |
| 4,277,146 | 7/1981 | Morgan et al. | 350/356 |
| 4,380,391 | 4/1983 | Buser et al. | 359/257 |
| 4,477,184 | 10/1984 | Endo | 356/5 |
| 4,530,600 | 7/1985 | Lopez | 356/5 |
| 4,620,113 | 10/1986 | Sizer, II et al. | 359/257 |
| 4,763,361 | 8/1988 | Honeycutt et al. | 359/156 |
| 5,206,697 | 4/1993 | Schwartz | 356/5 |

Primary Examiner—Richard E. Chilcot, Jr.
Assistant Examiner—K. Negash
Attorney, Agent, or Firm—William M. Hobby, III

[57] ABSTRACT

An optical transceiver is provided for transmitting a light pulse to a target and for receiving a reflected light pulse from the target. The transceiver includes a light source for transmitting a coherent light pulse which is reflected by the target along a first optical path as a reflected light pulse. The transceiver also includes a trigger signal generating circuit, coupled to the light source, for generating a trigger signal to indicate when the light pulse is transmitted. The transceiver further employs an attenuation device, responsive to the trigger signal and situated in the first optical path to intercept the reflected light pulse, for attenuating optical transmission through the first optical path inversely as a function of time from generation of the light pulse. In this manner, reflected light pulses reflected from targets close to the transceiver receive a greater amount of attenuation than reflected light pulses reflected from more distant targets.

8 Claims, 3 Drawing Sheets

OPTICAL TRANSCEIVER APPARATUS HAVING TIME PROGRAMMED GAIN

BACKGROUND OF THE INVENTION

This invention relates in general to optical transceivers and, more particularly, to laser rangefinders which are capable of adapting to a wide dynamic range of target reflection intensities.

A laser rangefinder is an optical transceiver which is capable of measuring the distance between the rangefinder and a target in the distance. The laser rangefinder includes a laser light source or laser transmitter, and further includes a photodetector or laser receiver. Typically, the laser transmitter irradiates the target with incident laser light pulses and the laser receiver receives the reflected light pulses. A signal processor in the rangefinder records the time between transmission of a pulse by the laser transmitter and reception of the reflected pulse back at the rangefinder receiver. The signal processor then uses this time difference to calculate the distance between the rangefinder and the target.

It is known to provide laser rangefinders with the ability to adjust the intensity of the laser beam transmitted from the laser transmitter to the laser target. This capability is useful during military training exercises to avoid eye injuries to friendly personnel by attenuating the laser beam transmitted to the target. It is also desirable to attenuate the intensity of the laser beam generated by the laser rangefinder to the minimum level required in order to avoid detection by enemy personnel.

When the target is distant from the laser rangefinder transmitter, the reflected beam from the target is relatively weak. However, when the target is close to the rangefinder, the reflected beam from the target is very strong. In the latter case, the reflected beam can be so strong as to cause saturation and/or malfunction of the photodetector in the receiver of the laser rangefinder. This, of course, is not desirable.

One common technique for attenuating the transmitted laser beam is to insert an optically absorptive material or filter in the laser beam's path. Unfortunately, this technique results in heat build-up in the absorptive material so that the material acts as a lens and distorts the collimation of the laser beam. Moreover, this approach provides only fixed attenuation of the transmitted laser beam's intensity.

Another approach is to provide a partially reflective element in the transmitted laser beam's path. In this instance, the partially reflective element is designed to pass only a small portion of the transmitted signal and to reflect the remainder to a path where it is absorbed by an optically absorptive material. This approach solves the aforementioned lensing problem, but still only provides a fixed attenuation.

U.S. Pat. No. 4,530,600 issued to Lopez for a "Variable Attenuator For Optical Transceiver" teaches continuously varying the attenuation of the laser beam transmitted by an optical transceiver. To accomplish this, a polarization rotation device such as a Pockels cell and a second polarizer are inserted in the path of the transmitted laser beam. Changing the amount of polarization rotation of the polarization rotation device which is positioned before the second polarizer varies the intensity of the laser beam transmitted from the transmitter. In this case, the polarization rotation device and the second polarization device together act as a variable attenuator.

U.S. Pat. No. 4,227,146 issued to Morgan for a "Visible And Infrared Intensity Limiter" teaches the use of a Pockels cell to form a limiter which cuts off transmission of a laser beam when the intensity of the beam reaches a predetermined amplitude.

Unfortunately, prior attenuation techniques do not adequately protect the laser rangefinder receiver from overload and saturation when the receiver receives a very strong reflected light signal from a very close target. In that situation, receiver overload damage may occur and even if damage does not occur, the receiver may take an undesirably long amount of time to recover from the overloading reflected signal. Rangefinder performance can thus be significantly degraded.

SUMMARY OF THE INVENTION

One object of the present invention is to provide a laser rangefinder including a receiver which is protected from overload damage.

Another object of the present invention is to provide a laser rangefinder including a receiver which reduces overload recovery saturation at the time the laser is fired, thus improving minimum range capability.

Yet another object of the present invention is to provide a laser rangefinder including a receiver which is less sensitive to high level atmospheric back scatter noise.

A further object of the present invention is to provide a laser rangefinder receiver which is capable of discriminating between multiple close range targets without saturation blurring the return signals together.

Still another object of the present invention is to provide a laser rangefinder including a receiver with improved dynamic range while permitting the preamp in the receiver to operate at its optimum gain and noise conditions.

In accordance with the present invention, an optical transceiver is provided for transmitting a light pulse to a target and for receiving a reflected light pulse from the target. The transceiver includes a light source for transmitting a coherent light pulse which is reflected by the target along a first optical path. The transceiver also includes a trigger signal generating circuit, coupled to the light source, for generating a trigger signal to indicate when the light pulse is transmitted. The transceiver further includes a first polarizer situated in the first optical path, and a second polarizer situated in the first optical path and oriented to exhibit a cross polarity with respect to the first polarizer. The transceiver still further includes a variable rotation polarizer device, responsive to the trigger signal and situated between the first and second polarizers and in the first optical path, for varying optical attenuation through the first optical path inversely as a function of time from transmission of the light pulse.

BRIEF DESCRIPTION OF THE DRAWINGS

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 1:
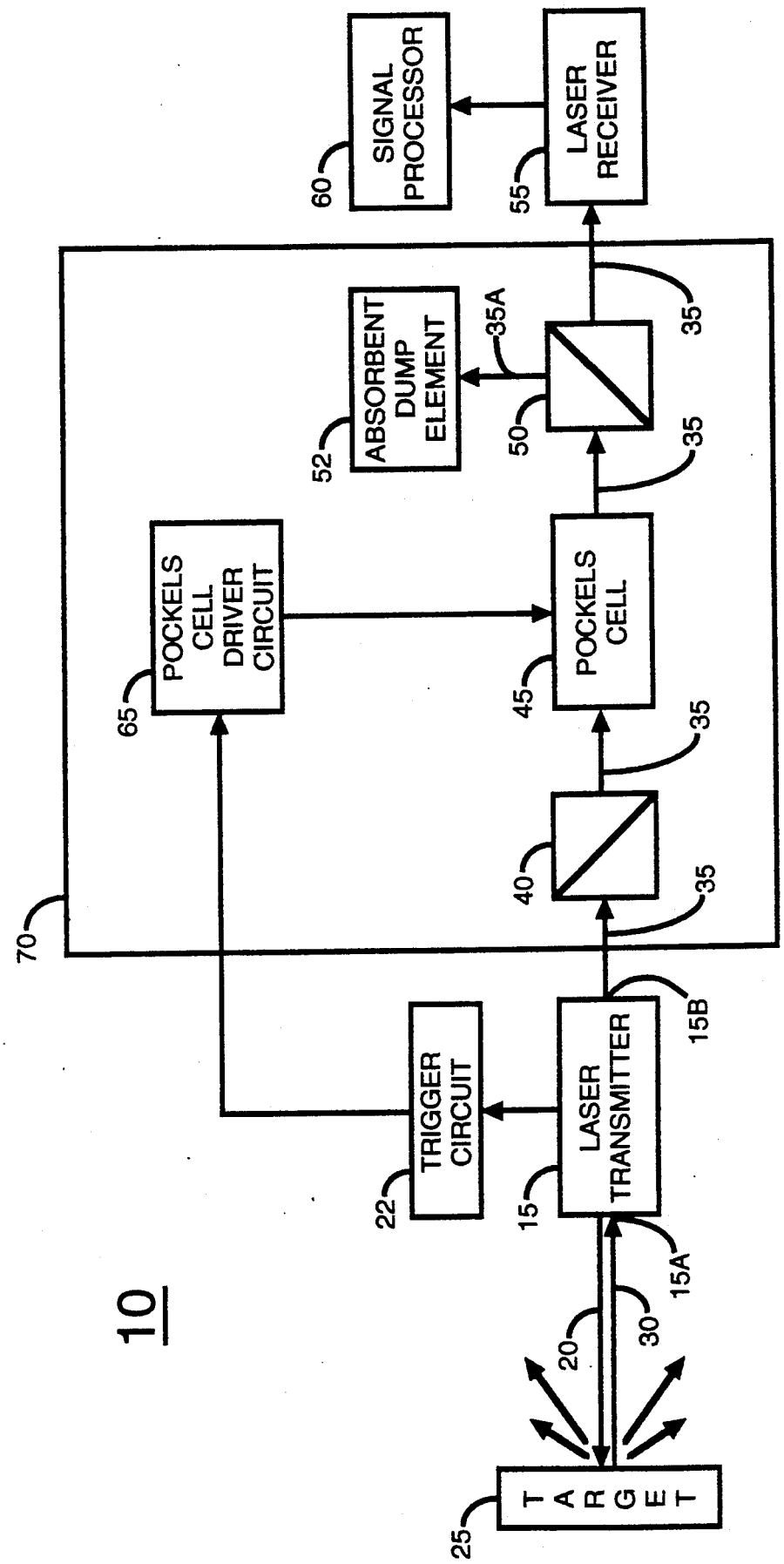
FIG. 1 is a block diagram representation which shows the optical transceiver or rangefinder of the present invention.

FIG. 1 is a block diagram representation which shows the optical transceiver of the present invention as laser rangefinder 10. Rangefinder 10 includes a laser transmitter 15 which generates a collimated coherent light signal 20 in the form of a relatively short duration laser pulse which exits transmit port 15A. A trigger circuit 22 generates a trigger signal each time transmitter 15 generates a laser pulse.

The incident pulse 20 generated by transmitter 15 impinges on target 25 and is reflected thereby. A portion of the resultant reflected light signal returns to laser transmitter 15 as reflected pulse 30. Laser transmitter 15 is designed such that received light signals such as reflected light pulse 30 pass through transmitter and out transmitter port 15B along light path 35

A polarizer 40 is situated in light path 35 adjacent laser transmitter port 15B so as to capture the reflected light pulses exiting port 15B. An electro-optic variable rotation polarizer device 45 such as a Pockels cell is situated adjacent polarizer 40 in light path 35 so as to capture the reflected light pulses exiting polarizer 40. A second polarizer 50, which is oriented at cross polarization or 90 degrees with respect to the polarization of polarizer 40, is situated adjacent Pockels cell 45 in light path 35 to capture the reflected light pulses exiting device 45.

In one embodiment of the invention, polarizer 50 is a beam polarizer/beam splitter which splits a portion of the reflected light beam into another optical path 35A while the remainder of the reflected light beam or reflected pulses continue along path 35. A dump element 52 of light absorbent material is situated in path 35A to absorb any light which is redirected along path 35A by polarizer/beam splitter 35. A laser receiver 55 or photodetector is situated in path 35 adjacent polarizer 50 to receive the reflected light pulses exiting polarizer 50 an path 35. A signal processor 60 coupled to rangefinder receiver 55 performs the distance to target calculation using the time difference between the time at which the incident pulse was transmitted by transmitter 15 and the time at which the corresponding reflected pulse is received by receiver 55.

A Pockels cell driver circuit is coupled between trigger circuit 22 and Pockels cell 45 as shown in FIG. 1 to control the amount of polarization rotation exhibited by Pockels cell 45 over time. An electro-optic time programmed gain module 70 which exhibits variable attenuation over time to the reflected pulses is thus formed by polarizers 40 and 50, Pockels cell 45, driver circuit 65 and dump element 52.

At time, $T_O$, when the laser fires a particular incident pulse, gain module 70 is at maximum attenuation. The trigger signal is sent from trigger circuit 22 to driver circuit 65 at time, $T_O$, to inform gain module 70 that the laser has been fired. Upon receiving the trigger signal, Pockels cell driver circuit 65 applies a control voltage, $V_{PC}$, to Pockels cell 45 which controls the polarization rotation of cell 45, and hence the attenuation exhibited by gain module 70 over time. The control voltage, $V_{PC}$, is small at first to cause minimum rotation and thus maximum attenuation for close targets which cause the reflected pulse to return quickly to receiver 55.. The control voltage, $V_{PC}$, gradually increases with time. As the control voltage, $V_{PC}$, increases the optical transmission through gain module 70 to receiver 55 correspondingly increases. At maximum range, that is for the most distant targets which take the longest amount of time for the reflected pulse to return, gain module 70 exhibits minimum attenuation or maximum optical transmission.

Thus, maximum attenuation is exhibited to the very intense reflected pulses which reflect from very close targets, while minimum attenuation is presented to weaker reflected pulses which reflect from distant targets.

The operation of electro-optic time programmed gain module 70 is now discussed in more detail. Polarizers 40 and 50 exhibit a crossed polarity with respect to each other. In other words, the polarity between polarizers 40 and 50 is 90 degrees such that a maximum of attenuation or a minimum transmission gain is exhibited to a reflected light pulse passing along path 35 in the case where Pockels cell 45 exhibits zero degrees of rotation.

Figure 2:
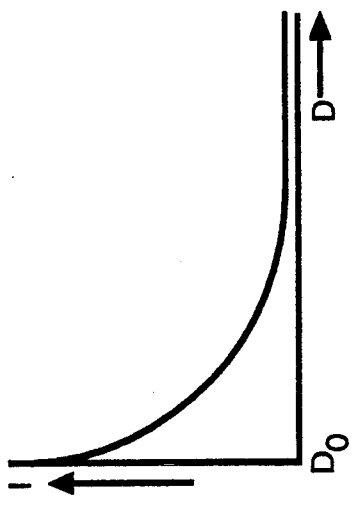
FIG. 2 is a graph depicting the control voltage signal, $V_{PC}$, over time, t.

However, Pockels cell 45 does subject the reflected light pulse to an amount of polarization rotation which depends on control voltage $V_{PC}$. As seen in FIG. 2, the control voltage $V_{PC}$ is initially nearly zero which corresponds to no rotation and maximum attenuation for targets which are extremely close to the rangefinder. The control voltage then rises to a relatively small value at first, thus resulting in a small amount of rotation which causes much attenuation and yet a small amount of transmission for targets which are relatively close to the rangefinder. The control voltage then increases over time to a maximum value of $V_{MAX}$ of 1000 volts, for example, which corresponds to a maximum amount of rotation by Pockels cell 45. This results in a maximum amount of transmission and minimum attenuation through gain module 70 for reflected pulses from targets which are most distant from the rangefinder.

Figure 3A:
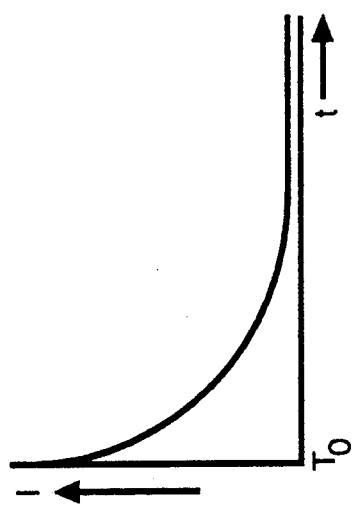
FIG. 3A is a graph which shows the intensity, I, of the reflected pulse vs. time, t.

FIG. 3A is a graph which shows the intensity, I, of the reflected pulse vs. time, t. This is actually a time profile which demonstrates that those reflected pulses which are quickly reflected back from the target exhibit a high intensity as one would expect for close targets. This time profile also demonstrates that reflected pulses which take a relatively long amount of time to reflect back from the target exhibit a low intensity as would be expected for distant targets.

Figure 3B:
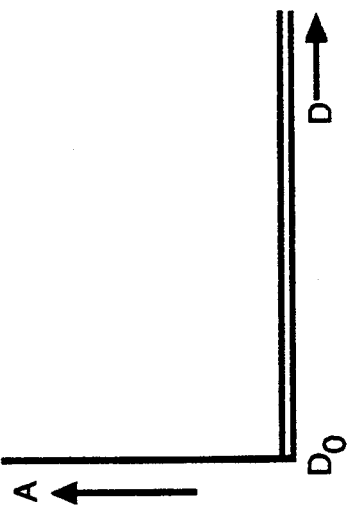
FIG. 3B is a graph which shows the intensity, I, of the reflected pulse vs. distance, D, between the rangefinder and the target.

FIG. 3B is a graph which shows the intensity, I, of the reflected pulse vs. distance, D, between the rangefinder and the target. This graph is a distance profile which illustrates that very close targets result in very high intensity reflected pulses whereas distant targets result in low intensity reflected pulses.

Figure 4:
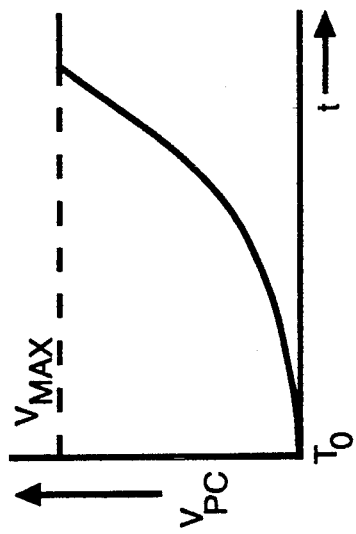
FIG. 4 is a graph which shows transmission gain of the electro-optic time programmed gain module over time, t.

FIG. 4 is a graph which shows transmission gain of gain module 70 over time, t. It is seen that module 70 exhibits a minimum gain when the laser fires the incident pulse at time $T_O$ and that the gain of module 70 increases over time. In this manner, reflected pulses which return quickly from very close targets receive a maximum of attenuation whereas reflected pulses which take a relatively large amount of time to return from distant targets receive a minimum of attenuation. It should thus be appreciated that the attenuation exhibited by gain module is at a maximum for very close targets and at a minimum for very distance targets and is at a middle value for targets between the minimum and maximum range. In other words, gain module 70 acts to attenuate optical transmission through optical path 35 inversely as a function of time from generation of the light pulse. The relationship illustrated in FIG. 4 is exponential.

Figure 5A:
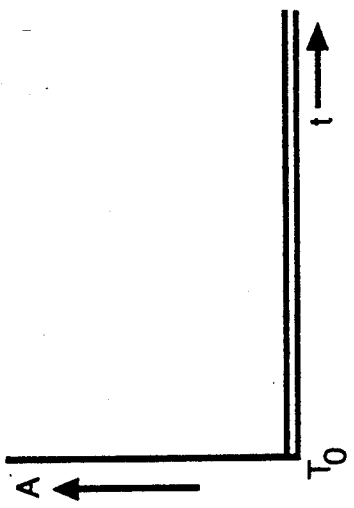
FIG. 5A is a graph which shows the amplitude, A, of the reflected pulse presented to the receiver over time, t.
Figure 5B:
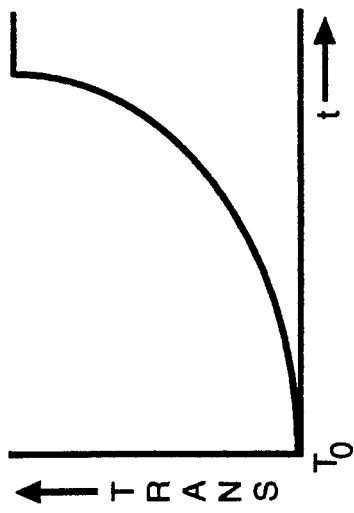
FIG. 5B is a graph which shows the amplitude, A, of the reflected pulse presented to the receiver over distance, D.

FIG. 5A is a graph which shows the amplitude, A, of the reflected pulse presented to the receiver over time, t. FIG. 5B is a graph which shows the amplitude, A, of the reflected pulse presented to the receiver over distance, D. It is noted that use of the invention desirably results in a relatively constant amplitude of the reflected pulse being presented to the receiver whether the reflected pulse is quickly returned from a close target or is returned significantly later from a distant target.

Figure 6:
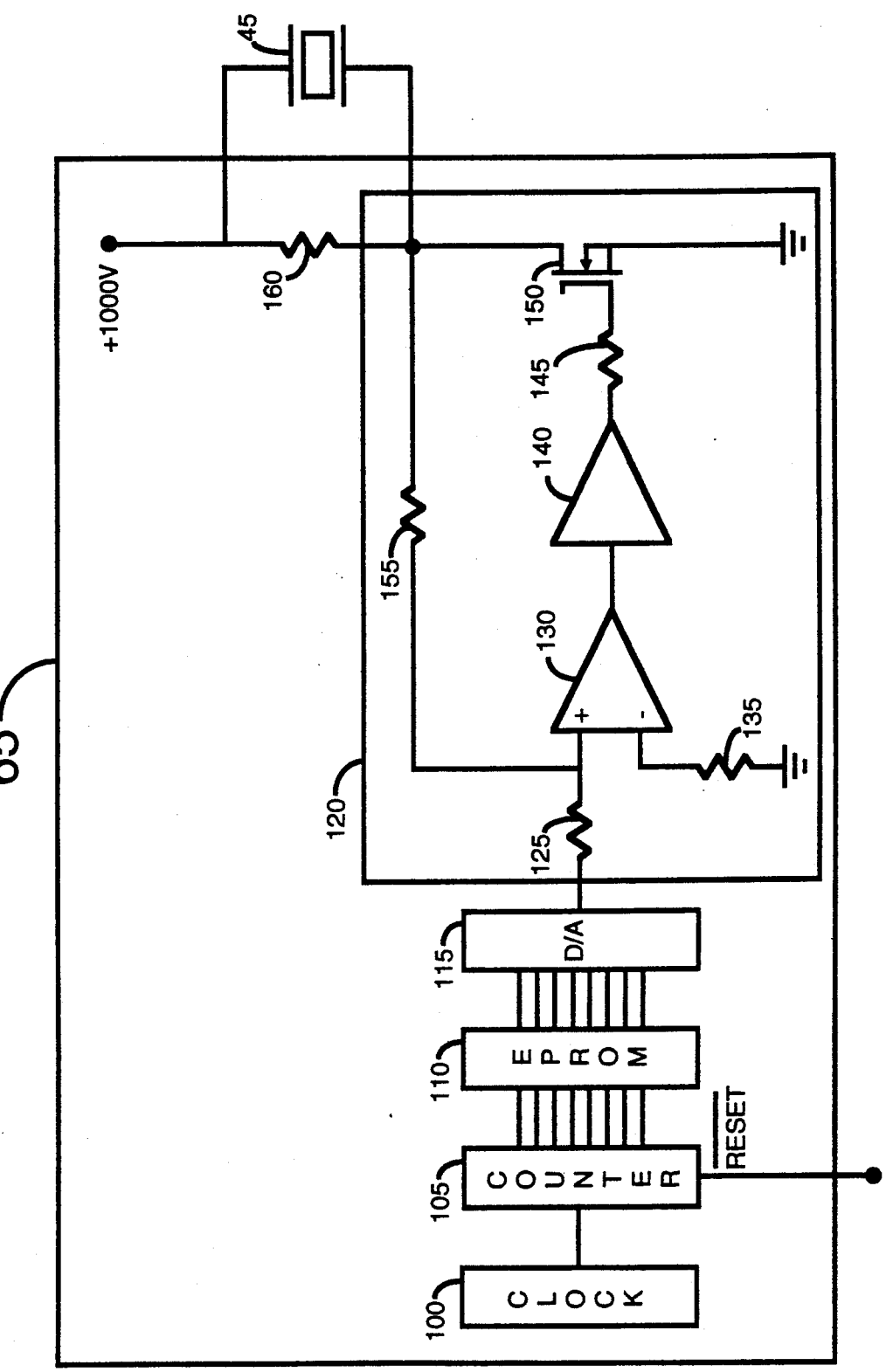
FIG. 6 is a schematic diagram showing one Pockels cell driver circuit which may be employed in the present invention.

Although many different types of Pockels cell driver circuits could be used to provide Pockels cell 45 with the control voltage $V_{PC}$ depicted in FIG. 2, one such driver circuit 65 is shown in FIG. 6. Driver circuit 65 includes a clock circuit 100 coupled to the input of a counter 105. Counter 105 includes a /RESET input which is coupled to the output of trigger circuit 22 of FIG. 1 such that the trigger signal is provided thereto. Counter 105 includes an 8 bit output which is coupled to an 8 bit input of an erasable programmable read only memory, EPROM, 110 which stores a representation of the desired $V_{PC}$ control voltage waveform. EPROM 110 includes an 8 bit output which is coupled to a digital to analog (D/A) converter 115 which takes the digital representation of the desired $V_{PC}$ control voltage waveform stored in EPROM 110 and converts it to a corresponding analog version thereof.

The output of D/A converter 115 is coupled to a 200 times amplifier 120 formed by resistor 125, OP amp 130, resistor 135, current buffer 140, resistor 145, field effect transistor FET 150, and feed back resistor 155, all connected as shown in FIG. 6. More particularly, the output of D/A converter 115 is coupled to the non-inverting input of OP amp 130 via a 500 ohm resistor 125. The inverting input of OP amp 130 is coupled to ground via a 500 ohm resistor 135. The output of OP amp 130 is coupled to the input of current buffer amplifier 140. The output of current buffer amplifier is 140 is coupled via a 50 ohm resistor 145 to the gate of FET 150, the source of which is coupled to ground.

The drain of FET 150, namely the output of 200 times amplifier 120, is coupled via a 1K ohm resistor 160 to a 1000 volt DC power supply as shown. The drain of FET 150 is also coupled by feedback resistor 155 to the non-inverting input of OP amp 130. Pockels cell 45 is coupled in parallel with resistor 160 such that a drive control voltage $V_{PC}$ which is variable between 0 volts and 1000 volts is applied to Pockels cell 45 in accordance with the control voltage waveform shown in FIG. 2.

It should be appreciated that the above described elements which make up electro-optic time programmed gain module 70 together effectively form a variable optical attenuator, the attenuation of which varies inversely as a function of time from transmission of the light pulse. Use of Pockels cell 45 in the configuration described is one way to achieve this type of attenuation. Those skilled in the art will appreciate that other variable attenuation devices may be used as well to achieve the variable attenuation characteristic achieved by module 70 such as PLZT devices, "in-fiber optic" devices, acoustic-optic devices and magneto-optic devices, for example.

While an optical transceiver or rangefinder apparatus has been described above, it is clear that a method of operating the optical transceiver has also been disclosed. More particularly, a method for transmitting a light pulse to a target and for receiving a reflected light pulse from the target is disclosed which includes the step of transmitting a coherent light pulse to a target which reflects the light pulse along a first optical path as a reflected light pulse. The method also includes the step of generating a trigger signal to indicate the time of transmission of the light pulse. The method further includes the step of attenuating optical transmission through the first optical path inversely as a function of time from transmission of the light pulse as indicated by the trigger signal. In one embodiment of the method, the attenuating step includes the step of passing the reflected light pulse through a first polarizer situated in the first optical path. The attenuating step further includes the steps of passing the reflected light pulse through a variable rotation polarizer device, and passing the reflected light pulse through a second polarizer situated in the first optical path and oriented to exhibit a cross polarity with respect to the first polarizer.

The foregoing describes an optical transceiver such as a laser rangefinder in which the laser receiver is protected from overload damage caused by high intensity reflected pulses returned from close targets. The disclosed laser rangefinder significantly reduces overload recovery saturation at the time the laser is fired thus improving minimum range capability. The rangefinder's receiver is desirably less sensitive to high level atmospheric back scatter noise than other receivers. Moreover, the receiver in the laser rangefinder exhibits an improved dynamic range while simultaneously permitting the receiver's preamp to operate at its optimum gain and noise conditions. The laser rangefinder receiver is advantageously capable of discriminating between multiple close range targets without saturation blurring the return signals together.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. An optical transceiver for transmitting a light pulse to a target and for receiving a reflected light pulse from said target comprising:

a light source for transmitting a coherent light pulse which is reflected by said target along a first optical path;

trigger signal generating means, coupled to said light source, for generating a trigger signal to indicate when said light pulse is transmitted;

a first polarizer situated in said first optical path;

a second polarizer situated in said first optical path and oriented to exhibit a cross polarity with respect to said first polarizer, and variable rotation polarizer means, responsive to said trigger signal and situated between said first and second polarizers and in said first optical path, for varying optical attenuation through said first optical path inversely as a function of time from transmission of said light pulse.

2. The optical transceiver of claim 1 further comprising an optical receiver positioned in said first optical path to receive said reflected light pulse when said reflected light pulses pass though said second polarizer.

3. The optical transceiver of claim 1 wherein said second polarizer comprises a polarizer/beam splitter which splits reflected light pulses between said first optical path and a second optical path.

4. The optical transceiver of claim 3 further comprising a optically absorbent element situated in said second light path to absorb reflected light pulses impinging thereon.

5. The optical transceiver of claim 1 wherein said variable rotation polarizer means comprises a Pockels cell.

6. An optical transceiver for transmitting a light pulse to a target and for receiving a reflected light pulse from said target comprising:

a light source for transmitting a coherent light pulse which is reflected by said target along a first optical path as a reflected light pulse;

trigger signal generating means, coupled to said light source, for generating a trigger signal to indicate when said light pulse is transmitted;

attenuating means, responsive to said trigger signal and situated in said first optical path to intercept said reflected light pulse, for attenuating optical transmission through said first optical path inversely as a function of time from transmission of said light pulse, whereby reflected light pulses reflected from targets close to said transceiver receive a greater amount of attenuation than reflected light pulses reflected from more distant targets.

7. A method for transmitting a light pulse to a target and for receiving a reflected light pulse from said target comprising:

transmitting a coherent light pulse to a target which reflects said light pulse along a first optical path as a reflected light pulse;

generating a trigger signal to indicate the time of transmission of said light pulse, and attenuating optical transmission through said first optical path inversely as a function of time from transmission of said light pulse as indicated by said trigger signal.

8. The method of claim 7 wherein said attenuating step further includes the steps of:

passing said reflected light pulse through a first polarizer situated in said first optical path;

passing said reflected light pulse through a variable rotation polarizer device, and passing said reflected light pulse through a second polarizer situated in said first optical path and oriented to exhibit a cross polarity with respect to said first polarizer.

* * * * *